J. E. EARLE.
Sewing Machine.
No. 31,642.
Patented March 5, 1861.
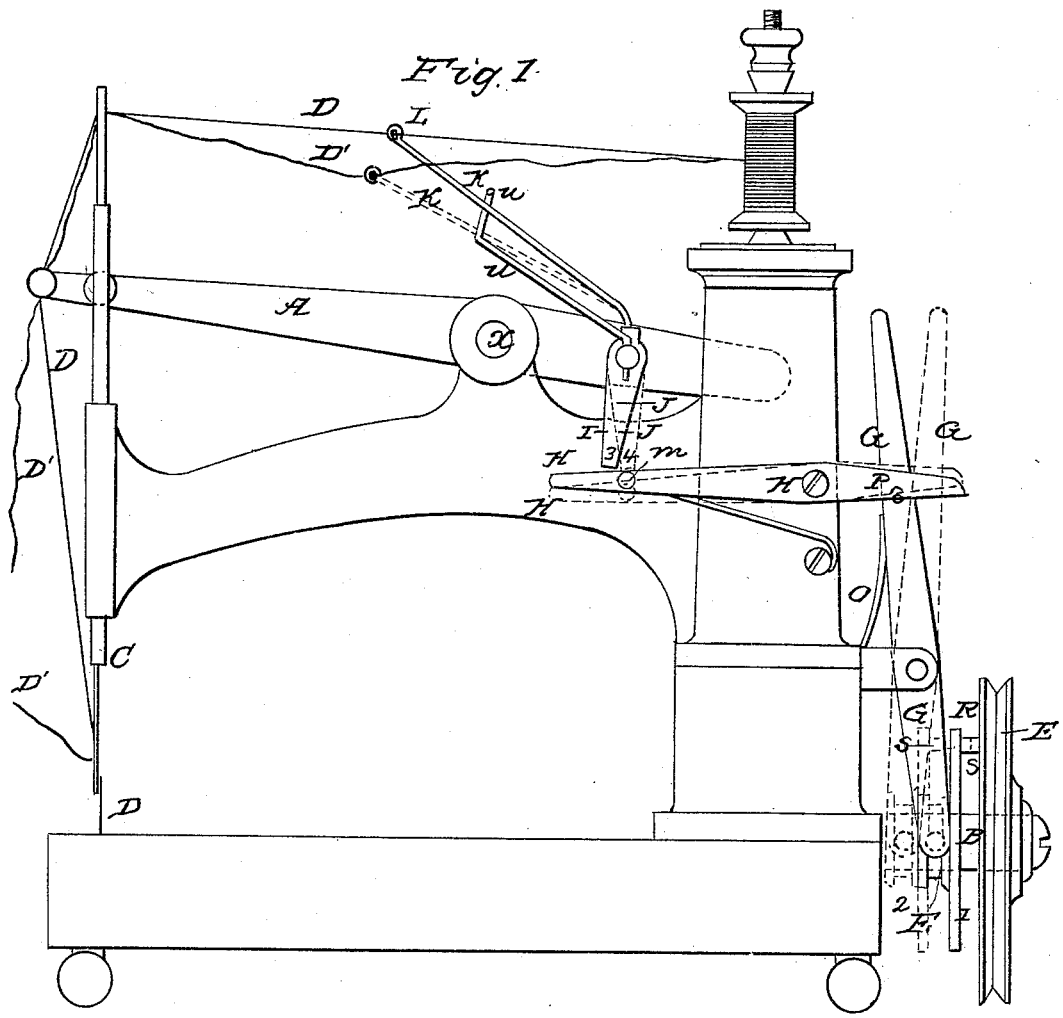
Witnesses
Inventor
John E. Earle

UNITED STATES PATENT OFFICE.

JOHN E. EARLE, OF BROOKLYN, ASSIGNOR TO HIMSELF AND SAMUEL HATHAWAY, OF NEW YORK, N. Y.

IMPROVEMENT IN SEWING-MACHINES.

Specification forming part of Letters Patent No. 31,642, dated March 5, 1861.

*To all whom it may concern:*

Be it known that I, JOHN E. EARLE, of Brooklyn, in the county of Kings and State of New York, have invented a new and useful Improvement in Sewing-Machines; and I do hereby declare that the following is a full, clear, and exact description of the construction and operation of the same, reference being had to the annexed drawing, making a part of this specification, in which—

Figure 1 is a side view of a sewing-machine with my improvement attached.

Same letters refer to like parts.

The nature of my invention consists in applying to sewing-machines an arrangement of levers, springs, or other mechanical device connecting directly or indirectly with the power used in driving said machines, said device being operated by the thread in use on said machine for the purpose that when the thread breaks or from other causes becomes too slack the said arrangement will disconnect the power from the machine without necessarily stopping the power, but positively stopping the machine without assistance from the person operating the machine.

Red lines denote a sewing-machine. Black lines show my improvement in the position when the power is connected and the machine at work. Blue lines shows the position when the thread is broken and the power disconnected.

A is the needle-arm having its bearing at X.

B is the shaft on which is the pulley E, to which the power is applied, said pulley E being loose upon the shaft B.

C is the needle; D, the thread drawn taut, as when drawing up the stitch.

F is a clutch turning with the shaft B, but sliding to and from the pulley E.

G and H are levers connecting with the clutch F.

I is a trip hung upon the needle-arm A.

K is a lever connecting the trip I with the thread D, which (the thread) passes through the eye L in the end of the lever K.

M is a pin or catch on the lever H.

When the machine is in motion the clutch F is in connection with the pulley E. As the needle-arm A rises the thread D becomes taut, as at D, and raises the lever K so much as to turn the trip I to position 3, so as to clear the pin M on the lever H; but should the thread D become too slack or break, as D', the lever K falls, as denoted by blue lines, and the trip I into position 4 and in contact with the pin M on the lever H, and, as the trip I continues to descend by the action of the needle-arm A, it presses the lever H, so as to allow the lever G to spring from the catch P and, by the reaction of the spring O, slip the clutch F from the pulley E, (position 1 to position 2,) so as to allow the pin R on the revolving pulley E to pass clear of the pin S on the clutch F, and the machine to stop, the pulley E continuing to revolve. After having properly adjusted the thread D, and when it is desired to again set the machine in motion, press the lever G into the catch P, which slips the clutch F, so as to bring the pins R and S into contact. The pulley E, revolving, turns the clutch F, and with it the machine is fully set in motion.

U is a guide to prevent the lever K from rising too high or falling too low.

Having thus fully described my invention, what I claim therein as new, and desire to secure by Letters Patent, is—

The combination of the needle-arm A, pulley-clutch F, levers G, H, and K, and trip I, constructed, arranged, and operating, substantially as set forth, to disconnect the power on the loosening of the thread.

JOHN E. EARLE.

Witnesses:
SAMUEL HATHAWAY,
JAMES HUFFINGTON.